Figure 1:
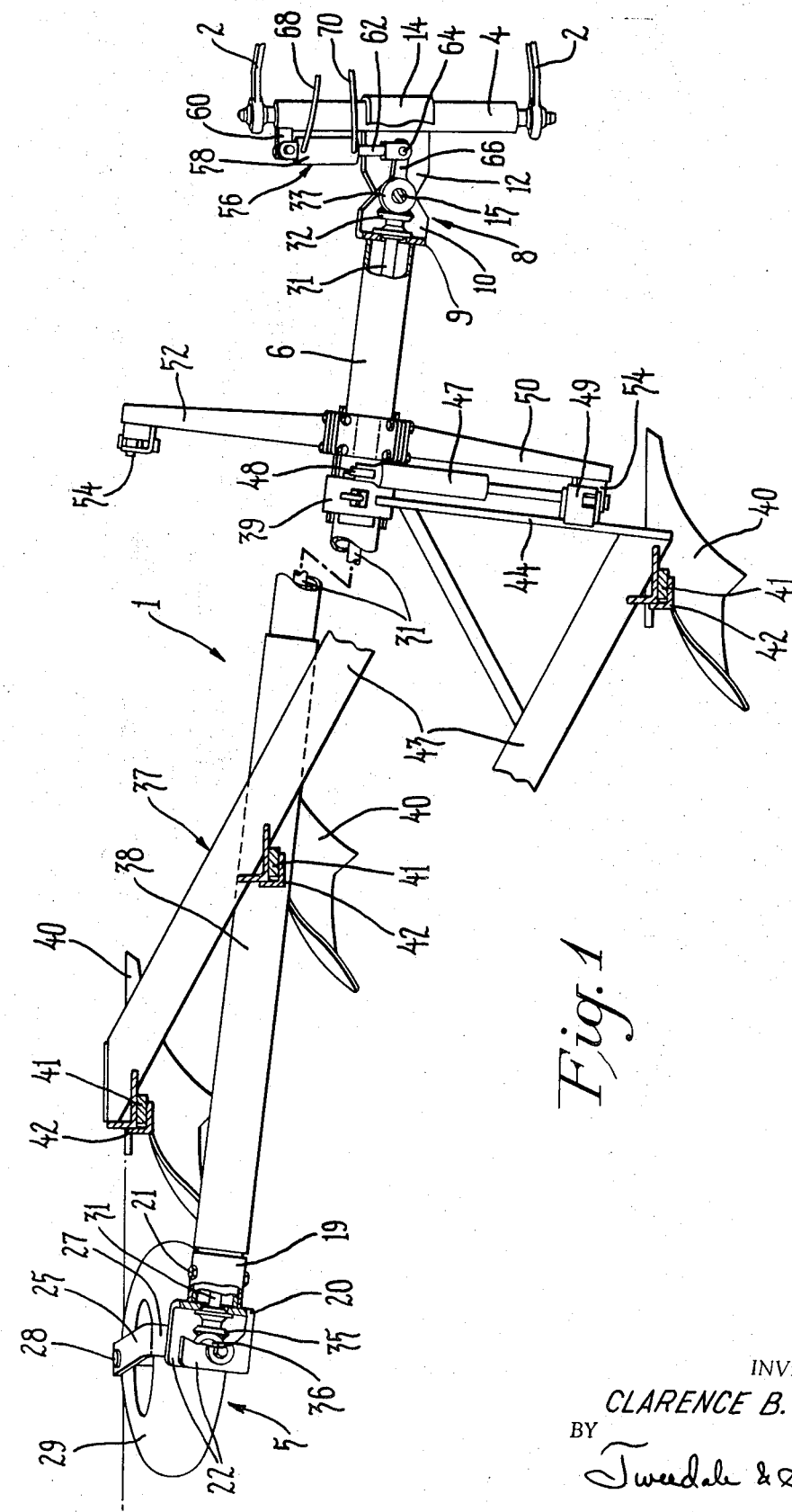

United States Patent

[11] 3,557,882

| [72] | Inventor | Clarence B. Richey<br>Fresno, Calif. |
|---|---|---|
| [21] | Appl. No. | 720,203 |
| [22] | Filed | Apr. 10, 1968 |
| [45] | Patented | Jan. 26, 1971 |
| [73] | Assignee | Massey-Ferguson Inc.<br>Des Moines, Iowa<br>a corporation of Maryland |

[54] SEMIMOUNTED TURNOVER PLOW WITH STEERABLE WHEEL
4 Claims, 2 Drawing Figs.

[52] U.S. Cl. .................................................. 172/223,
172/285
[51] Int. Cl. ..................................................... A01b 3/28
[50] Field of Search ........................................... 172/224,
225, 226, 212, 278, 282, 284, 285, 291; 280/400,
89.2

[56] References Cited
UNITED STATES PATENTS

| 1,578,084 | 3/1926 | Neufang ..................... | 172/291X |
| 2,879,853 | 3/1959 | Seng ........................... | 172/226 |
| 3,428,136 | 2/1969 | Johannsen et al. .......... | 172/285 |

FOREIGN PATENTS

| 911,190 | 5/1954 | Germany ..................... | 56/23 |

Primary Examiner—Robert E. Pulfrey
Assistant Examiner—James W. Peterson
Attorney—Gerhardt, Greenlee and Farris ABSTRACT: A semimounted, two-way turnover plow including a frame connected at its forward end with a tractor hitch, and having a steerable wheel supporting its trailing end. A remotely operable hydraulic ram at the forward end of the frame controls the position of the wheel with respect to the frame through a control shaft to positively steer the trailing end. The wheel also responds to changes in direction of the tractor to steer the trailing end of the frame in accordance with such changes.

INVENTOR.
CLARENCE B. RICHEY
BY
Tweedale & Gerhardt
ATTORNEYS.

3,557,882

SEMIMOUNTED TURNOVER PLOW WITH STEERABLE WHEEL

BACKGROUND OF THE INVENTION

1. Field of the Invention

This invention relates generally to semimounted implements, and is particularly concerned with turnover plows supported at the front on a draft vehicle and at the rear on a wheel that is steerable by a remotely operable power element.

2. Description of the Prior Art

In semimounted, turnover plows, the wheel supporting the trailing end must be mechanically linked to the hitch of a tractor or other draft vehicle to keep it upright as the plows are rotated from one position to another. Furthermore, with multiple bottom wide plows, the wheel must necessarily be offset from the longitudinal axis of the tractor during plowing and accordingly must shift from one side to the other with respect to the tractor longitudinal axis when the plows are reversed from left- to right-hand and vice versa. It is also necessary that the rear wheel be maintained in alignment with the direction of movement during plowing.

My copending application Ser. No. 524,191 entitled, "Semimounted Earthworking Implement," filed Feb. 1, 1966 discloses a semimounted plow in which an elongated frame has its trailing end supported by a wheel which has a rotary axis maintained at a fixed distance from the longitudinal axis of the frame in all positions of the plows. The wheel is interconnected to a control shaft having bevel gears engaged with the spindle of the wheel and a spindle at the forward end of the frame at the connection with the draft vehicle such that the wheel has a fixed position relative to the longitudinal axis of the frame in either of the plowing positions, and is responsive to changes in direction of the draft vehicle to steer the trailing end of the frame around turns.

An object of this invention is to provide a two-way semimounted turnover plow having a wheel supporting the trailing end that can be positively steered from a remote position, and can also be maintained in a set position relative to the longitudinal axis of the draft vehicle to steer the trailing end of the implement to the proper position as the plows are reversed, and will respond to changes in direction to steer the trailing end of the implement.

SUMMARY OF THE INVENTION

In accordance with the present invention, the implement includes an elongated draft frame member with forward connecting means for connecting the forward end of the draft frame member on the tractor hitch for side to side pivotal movement. The forward connecting means includes a first or front spindle rotatably mounted on the forward connecting means which is connected through a control shaft with a rear or second spindle mounted adjacent the rear of the draft frame member. The rear wheel is carried by the second spindle and is steered by rotation of the second spindle in response to rotation of the first spindle. Power means in the form of a hydraulic ram is connected with a first spindle and is operable from the tractor seat or other remote position to selectively rotate the first spindle to thereby steer the rear wheel. Furthermore, the hydraulic power element is also operable to maintain the first spindle in a selected angular position so that the rear wheel is steered in accordance with changes in direction of the tractor.

Figure 2:
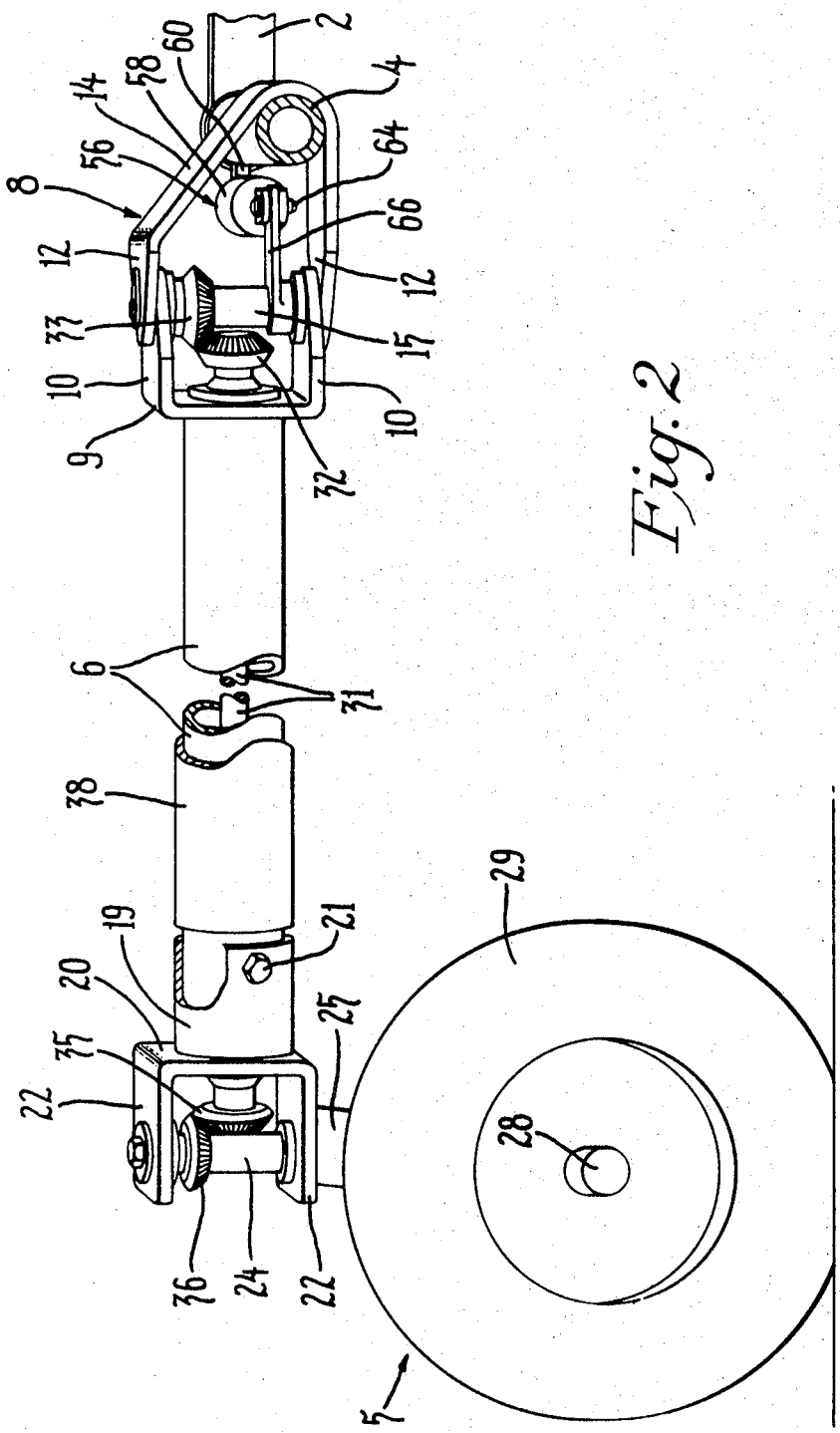

The foregoing, and other objects, advantages and features of the invention will become apparent from the following description taken in connection with the accompanying drawing in which:

FIG. 1 is a plan view of an implement embodying the invention with certain parts being broken away; and FIG. 2 is a side elevation of the implement of FIG. 1 with the plow bottoms omitted to show certain details of construction.

In the drawings, reference numeral 1 collectively designates an implement in the form of a two-way turnover plow connected at its forward end with a tubular cross bar 4 mounted between the trailing ends of the lower draft links 2 of a tractor (not shown) having a conventional three-point hydraulic hitch. The rear end of implement 1 is supported on a wheel or ground support assembly 5.

Implement 1 includes an elongated draft frame member 6, preferably of tubular construction, on which is mounted a forward connecting assembly 8 including a C-shaped bracket 9 with vertically spaced arms 10. Arms 10 of bracket 9 are received between the ends of a pair of vertically spaced arms 12 of a frame member 14 mounted on cross bar 4. Arms 10 and 12 are pivotally connected together by a spindle 15 rotatably mounted on frame 14 between arms 12.

The wheel assembly 5 is mounted on a bracket 20 secured to the rear of a sleeve 19 which in turn is nonrotatably secured to draft frame member 6 by bolts 21. Bracket 20 is formed with vertically spaced, rearwardly projecting arms 22. A spindle 24 is rotatably mounted between arms 22, and the shaft 28 of a ground wheel 29 is mounted on an arm 25 having its upper end 27 nonrotatably secured to the lower end of spindle 24. Rotation of spindle 24 causes wheel 29 to turn about the axis of spindle 24.

Wheel 29 is caused to rotate about the axis of spindle 24 in accordance with the rotation of spindle 15 about its axis by motion transmitting means in the form of a control shaft 31 concentrically journaled within draft frame member 6. A beveled pinion gear 32 is mounted on control shaft 31 at its forward end and is engaged with a beveled pinion gear 33 nonrotatably mounted on spindle 15. Mounted on the rear end of control shaft 31 is a beveled pinion gear 35 which in turn is engaged with a beveled pinion gear 36 nonrotatably mounted on spindle 24. As draft frame member 6 swings to either side of the longitudinal axis of the tractor about the axis of spindle 15, and if spindle 15 is prevented from rotating about its axis, control shaft 31 is caused to rotate by movement of pinion 32 relative to pinion 33, which motion is transmitted to spindle 24 through gears 35 and 36 and causes wheel 29 to turn about the axis of spindle 24 in accordance with changes in the direction of the tractor.

Draft frame member 6 carries a frame 37 for supporting plow bottoms or similar earthworking tools. Frame 37 is supported on draft frame member 6 by means of a sleeve 38 concentrically mounted on draft frame member 6.

A plurality of oppositely projecting left- and right-hand plow bottoms 40 are mounted on a beam 43 which is in turn secured intermediate its ends to sleeve 38. Only the right-hand plow bottoms 40 are visible in the drawings. Plow bottoms 40 have standards 41 which are secured to mounting plates 42. Beam 43 has its forward end connected with a rotatable collar 39 by a transverse frame member 44. When the tractor reaches the end of the field and turns around, beam 43 is rotated 180° about the common axis of draft frame member 6 and sleeve 38 to move the right-hand plows to their inoperative position, and the left-hand plows move into position to engage the ground. For transport, the beam 43 and sleeve 38 are rotated 90° about draft frame member 6 from the position shown in FIG. 1 with the result that both the left- and right-hand plow bottoms project laterally from sleeve 38 out of engagement with the ground.

The mechanism for moving the plows between the transport and opposite working positions may include a hydraulic ram 47, the cylinder of which is pivotally mounted on an arm 48 projecting upwardly from the draft frame member 6, and the piston of which is connected with a locking assembly 49 carried by the transverse frame member 44 and which is alternately engageable with latches 54 carried at the ends of laterally projecting arms 50 and 52. The details of the turnover mechanism form no part of the present invention. My copending application Ser. No. 531,876, and now U.S. Pat. No. 3,428,135, entitled, "Turnover Plow," filed Mar. 4, 1966, the entire disclosure of which is incorporated herein by reference, may be referred to for a disclosure of a suitable mechanism for rotating the plow frame about draft frame 6 between its transport and opposite working positions.

When the right-hand plow bottoms are in the plowing position as shown in FIG. 1, the soil forces acting on the plow urges the draft frame member to an offset position relative to the tractor longitudinal axis such that the trailing end of the draft frame member is to the left of the longitudinal axis. When the plow is reversed so that the left-hand plow bottoms are in the plowing position, the soil forces urge the trailing end of the plow to the opposite side of the tractor longitudinal axis. It is obviously desirable that the wheel 29 be aligned with the direction of movement with the tractor while plowing, and that it be in line with the draft frame member 6 when the plows are in their transport position so that the draft frame member trails behind the tractor along its longitudinal axis during straight line movement. Furthermore, it is desirable in either the plowing or transport position that the wheel 29 be adjusted in response to changes in the direction of movement of the tractor to steer the trailing end around turns.

In accordance with the present invention, the position of the wheel 29 relative to the longitudinal axis of the draft frame member 6 is controlled by a power means connected with the first spindle 15, the power means being in the form of a hydraulic ram 56. The hydraulic ram 56 includes a cylinder 58 pivotally connected to an arm 60 projecting from the tubular cross member 4, and a piston rod 62 pivotally connected at 64 with a lever 66. Lever 66 is nonrotatably secured to spindle 15 so that extension and retraction of the piston rod within cylinder 58 causes rotation of spindle 15 about its axis. Moreover, when the ram is stationary, it acts to prevent rotation of spindle 15 about its axis. The ram 56 is of the double-acting type having hydraulic hoses 68 and 70 preferably connected with the tractor hydraulic system so as to be controlled by the operator from the tractor seat.

As shown in FIG. 1, the plow is in its right-hand plowing position and the right-hand draft link 2 is preferably positioned lower than the left-hand draft link 2 by an extensible drop link (not shown) or the like, to tilt the entire implement so that the wheel, in addition to being steerable, is canted to counteract the side forces acting on the plow bottoms and reduce the friction on the landside of the plow bottoms.

When the plow is rotated to its transport position from the position shown in FIG. 1, the operator actuates the ram 56 to shift the position of wheel 29 into alignment with the draft frame tube 6. When the left-hand plow bottoms are moved into their plowing position, the operator actuates the hydraulic ram to cause wheel 29 to shift to a position to steer the trailing end of draft frame tube 6 to the right of the tractor longitudinal axis. When the ram 56 is stationary, any change in the direction of movement of the tractor causes the pinion gear 33 on spindle 15 to rotate the control shaft 31 due to its engagement with pinion 32 and thereby correspondingly adjusts the angular position of wheel 29 to steer the trailing end of the frame around the turn.

While a specific form of the invention has been illustrated and described in the foregoing specification, it should be understood that the invention is not limited to the exact construction shown. On the contrary, various modifications and alterations in the construction and arrangement of parts, as well as numerous equivalents, will be apparent to those skilled in the art without departing from the scope and spirit of the invention.

I claim:

1. A reversible semimounted earthworking implement including an elongated draft frame member having forward connecting means for pivotally supporting the forward end of the draft frame member on a draft vehicle for side-to-side swinging movement, a first spindle rotatably mounted on said forward connecting means for pivotal movement about the axis of the pivotal support of the forward end of the draft frame member, a second spindle rotatably mounted on said draft frame member at a location spaced from the first spindle along the length of the draft frame member, a control shaft rotatably mounted in the draft frame member and drivingly connected to said spindles, power means connected with said first spindle operable to selectively rotate said first spindle and to maintain said first spindle in a selected angular position relative to the forward connecting means, and a wheel assembly carried by said second spindle for supporting the rear end of the implement responsive to rotation of said second spindle as transmitted from said first spindle by the control shaft for steering the rear end of the implement in accordance with the selective rotation of said first spindle by said power means and in accordance with changes in the direction of movement of the draft vehicle.

2. A semimounted earthworking implement as claimed in claim 1 wherein said power means includes an extensible and retractable hydraulic ram operable from a remote position, and further including a lever nonrotatably mounted on said first spindle, said ram being pivotally connected with said lever to turn said first spindle upon extension and retraction of the ram to positively steer said wheel assembly, said ram when stationary operating to prevent rotation of said first spindle so that angular movement of the draft frame relative to said first spindle causes corresponding rotation of the second spindle to steer the wheel assembly in accordance with said angular movement.

3. A semimounted implement as claimed in claim 2 further including a plurality of right- and left-hand plow bottoms mounted on the draft frame for movement between (1) a right-hand operating position in which the right-hand plow bottoms are in a ground engaging position and the left-hand plow bottoms are in an inoperative position out of engagement with the ground, (2) a transport position in which all of the plow bottoms are in inoperative positions out of engagement with the ground, and (3) a left-hand operating position in which the left-hand plow bottoms are in a ground engaging position and the right-hand plow bottoms are in an inoperative position out of engagement with the ground, said wheel assembly including a ground engaging wheel cooperable with the forward connecting means for supporting the frame above the ground in all positions of the plow bottoms, said wheel being mounted on said draft frame in a position to trail one of the plow bottoms in the furrow formed thereby in said operating positions, and the distance between the axis of rotation of the wheel and the frame as measured along an axis normal to the axis of rotation of the wheel is the same when the plow bottoms are in operative or transport positions.

4. A semimounted earthworking implement as claimed in claim 1 wherein said control shaft is drivingly connected with said spindles by gearing including front and rear bevel gears nonrotatably mounted on the front and rear ends of the control shaft, respectively; and a bevel gear mounted on the first spindle engaged with the front bevel gear and a bevel gear mounted on the second spindle engaged with the rear bevel gear.